United States Patent
Boucher et al.

(10) Patent No.: US 12,452,971 B1
(45) Date of Patent: Oct. 21, 2025

(54) EMULATED WHITE LED IN A COLOR-CHANGING LIGHTING FIXTURE

(71) Applicant: LMPG Inc., Longueuil (CA)

(72) Inventors: Guillaume Boucher, Québec (CA); Nicolas Paquin, L'Ancienne-Lorette (CA)

(73) Assignee: LMPG Inc., Longueuil (CA)

( * ) Notice: Subject to any disclaimer, the term of this patent is extended or adjusted under 35 U.S.C. 154(b) by 0 days.

(21) Appl. No.: 18/932,267

(22) Filed: Oct. 30, 2024

Related U.S. Application Data

(60) Provisional application No. 63/670,157, filed on Jul. 12, 2024.

(51) Int. Cl.
| | |
|---|---|
| *H05B 45/20* | (2020.01) |
| *H05B 45/10* | (2020.01) |
| *H05B 47/155* | (2020.01) |

(52) U.S. Cl.
CPC ............. *H05B 45/20* (2020.01); *H05B 45/10* (2020.01); *H05B 47/155* (2020.01)

(58) Field of Classification Search
CPC ....... H05B 45/20; H05B 45/10; H05B 45/155
See application file for complete search history.

(56) References Cited

U.S. PATENT DOCUMENTS

| | | | |
|---|---|---|---|
| 7,198,397 B2 | 4/2007 | Bennett et al. | |
| 11,800,624 B2 | 10/2023 | Kodadek, III et al. | |
| 2008/0136334 A1* | 6/2008 | Robinson | H05B 47/18 315/363 |
| 2013/0020933 A1 | 1/2013 | Levermore et al. | |
| 2015/0351187 A1* | 12/2015 | McBryde | H05B 47/19 315/185 R |
| 2015/0351191 A1* | 12/2015 | Pope | H05B 45/37 315/294 |
| 2016/0019851 A1 | 1/2016 | Chen et al. | |
| 2016/0150616 A1* | 5/2016 | Bell | F21V 14/08 315/294 |
| 2016/0242244 A1* | 8/2016 | Tseng | H05B 45/20 |
| 2017/0027037 A1* | 1/2017 | Sedzin | H05B 45/28 |
| 2022/0095428 A1* | 3/2022 | Edwards | H05B 45/20 |
| 2022/0183132 A1* | 6/2022 | Kodadek, III | H05B 45/10 |
| 2024/0255128 A1* | 8/2024 | Hoffman | F21V 7/0058 |

FOREIGN PATENT DOCUMENTS

WO WO-2009156244 A2 * 12/2009 ......... H05B 45/3574

OTHER PUBLICATIONS

International Search Report and Written Opinion mailed on Apr. 11, 2025 in International Application No. PCT/CA2024/051607, 7 pages.

* cited by examiner

*Primary Examiner* — Seokjin Kim
(74) *Attorney, Agent, or Firm* — Joseph M Maraia; Alex Kuo

(57) ABSTRACT

Correlated color control (CCT) of a white channel in a color changing lighting fixture is performed by mixing red, green, blue and white light sources. The CCT of the white channel configured or corrected and maintained even while mixing the white channel with the very color channels that are used to configure or correct it. A processing unit uses mathematical models of the light sources to emulate the color temperature of the white components. Using the mathematical models, an RGBW color mix is computed for the white channel alone. The resulting RGBW mix is then combined with levels of red, green and blue as selected by a user.

14 Claims, 3 Drawing Sheets

EMULATED WHITE LED IN A COLOR-CHANGING LIGHTING FIXTURE

CROSS-REFERENCE TO RELATED APPLICATIONS

This application claims benefit to U.S. Provisional Application No. 63/670,157 filed on Jul. 12, 2024, the contents of which are incorporated by reference herein in their entireties for all purposes.

FIELD OF TECHNOLOGY

The disclosed system and method is in the field of lighting control and more particularly in the field of multi-channel lighting control of LED lighting systems.

BACKGROUND

In the color-changing lighting industry, it is common to provide Red, Green, Blue White (RGBW) fixtures with different white LED CCTs. For example, there may be different models of the same RGBW fixture in which the only difference is the CCT of the White LED, for example 2700K, 3000K, 4000K, depending on the application for the customer.

This has required lighting fixture manufacturers to maintain many different SKUs for each LED electronic board thereby adding substantial costs from the design and engineering stages to production.

In addition, once previously available RGBW fixtures are installed, the CCT of the White LED cannot be tuned easily if it does not fit the customer's expectations. While there are previously known ways to correct the white LED's CCT by adding hints of R/G/B to the white in constant ratios from the lighting controller's standpoint, for example, it becomes exceedingly complex to maintain the correction of the white while mixing with color channels.

It is previously known to mix White with Red, Green and Blue components to tune the CCT the CCT of a White light. However, in these previously known methods, CCT correction has been the sole purpose of the Red, Green and Blue components when they are used to correct the white channel's CCT. In the previously known methods of CCT correction, the Red, Green and Blue components cannot be used to provide saturated colors while being mixed to the corrected white channel.

SUMMARY

The present disclosure includes a system and method for configuring the correlated color temperature (CCT) of a White channel in a color-changing lighting fixture by mixing Red, Green, Blue and White light sources. The disclosed system and method configures the CCT of the White channel and maintains its CCT even while mixing the White channel with the very color channels that are used to correct it. A processing unit uses mathematical models of the light sources to emulate the color temperature of the White components. First, an RGBW mix is computed for the White channel alone. Then the resulting RGBW mix is combined with required levels of Red, Green, and Blue desired by the user.

According to an aspect of the present disclosure, a method of controlling a lighting apparatus starts by receiving a multi-channel signal for controlling the lighting apparatus. The disclosed method and apparatus then transforms the multi-channel signal into an RGBW+White CCT setpoint. The RGBW+White CCT setpoint including a control level (% intensity) for each of a Red, Green, Blue and White channel and a White CCT value (A). In instances where the multi-channel signal for controlling the light apparatus is received as an RGBW+White CCT setpoint, this transformation step is omitted.

According to the disclosed method, a first adjusted RGBW signal (emulated white) is computed based on the white channel's control level and the White CCT value. The first adjusted RGBW signal represents an RGBW mix (RGB ratios) that would provide 100% white intensity corrected to the desired White CCT. The first adjusted RGBW signal is scaled to compute a scaled first adjusted RGBW signal (scaled emulated white) at a scale corresponding to the White channel control level in the RGBW+White CCT setpoint.

According to the disclosed method, the Red, Green, and Blue levels of the RGBW+White setpoint are added to the scaled first adjusted RGBW signal (scaled emulated white) to compute a second adjusted RGBW signal. A global intensity ratio is computed based on the RGBW setpoint. Following computation of the global intensity ratio, the second adjusted RGBW signal is scaled to compute a scaled second adjusted RGBW signal based on the global intensity ratio, such that the intensity ratio of the scaled second adjusted RGBW signal matches the global intensity ratio. The scaled second adjusted RGBW signal is applied to control the lighting apparatus.

The disclosed method and apparatus provides greater flexibility and benefits to manufacturers and customers of lighting systems. From the manufacturer standpoint, the disclosed method and apparatus allows them to design and manufacture a single multi-channel lighting unit that provides a range of White LED CCT options. This allows greater customization for out-of-spec requirements, for example, and also enables designing CCT shifting applications within the same unit. Examples of such CCT shifting applications include tunable white or dim-to-warm effects, for example.

The disclosed technology provides cost saving opportunities from alternate SKU management, which can lead to increased profits for the manufacturer and more affordable products for their customers.

From the customer's standpoint, the disclosed method and apparatus eliminates the need to choose a device having particular CCT and instead provides a device in which the White channel CCT can always be adjusted. The disclosed method and apparatus may also provide additional dynamic white effects that were not previously available to the customer Although aspects of the present disclosure described with reference to colored and white LEDs it should be understood by persons skilled in the art that various alternative embodiments of the disclosed technology may be implemented within the scope of the present invention using colored and white light sources other than LEDs.

BRIEF DESCRIPTION OF THE DRAWINGS

The present invention is described herein in with reference to the following drawings in which like numerals designate like elements and wherein.

DETAILED DESCRIPTION

Figure 1:
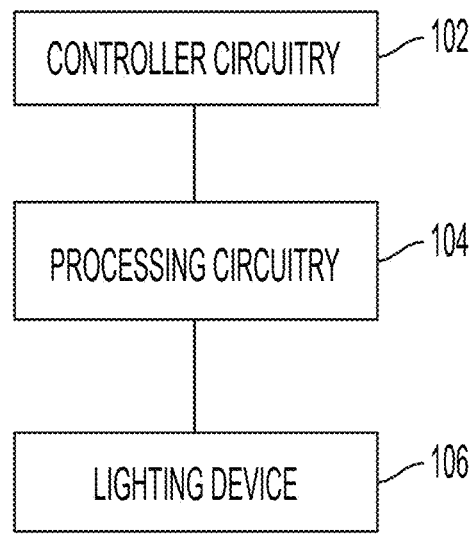
FIG. 1 is a schematic block diagram of a lighting and control system according to an aspect of the present disclosure.

Referring to FIG. 1, in an illustrative embodiment the disclosed apparatus includes a lighting device 106 having Red, Green, Blue and White LEDs and LED driving circuits, control circuitry 102 providing lighting control signals, and processor circuitry 104 such as a microcontroller or other computing device interposed between the control circuitry 102 and the lighting device 106. The disclosed apparatus uses characterization data of a control chain from data control inputs to light emitted from the LEDs. The characterization data provided by the control circuitry defines how the LEDs react according to a desired intensity ratio. According to aspects of the present disclosure, this data should be related to the exact model of LEDs that are being used, otherwise the result may be unpredictable.

Figure 2:
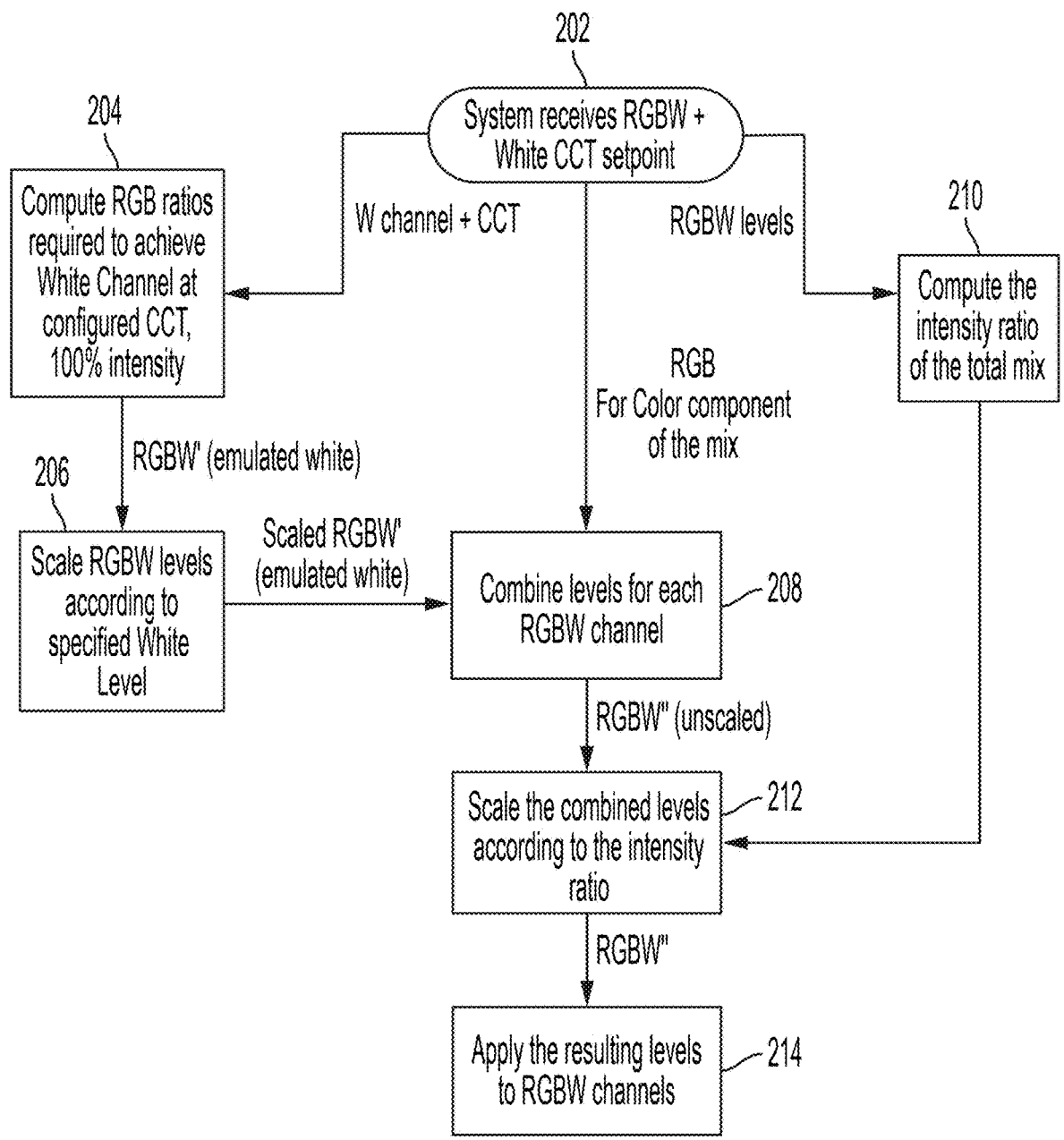
FIG. 2 is a process flow diagram showing a method for controlling a lighting apparatus according to an aspect of the present disclosure.

FIG. 2 shows a lighting control process that can be implemented for various types of control inputs received from a controller.

Figure 3:
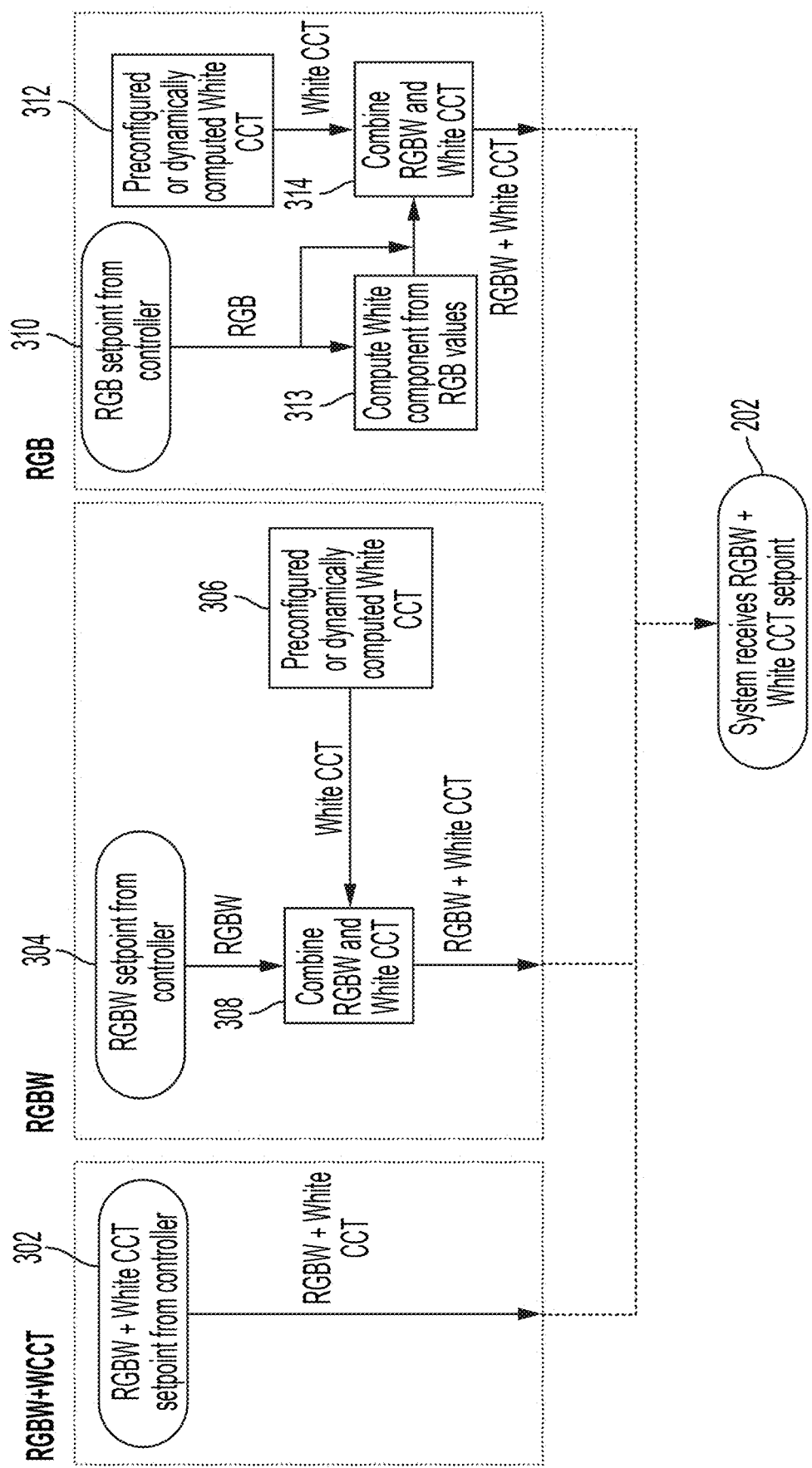
FIG. 3 is a process flow diagram showing methods for transforming various control inputs according to an aspect of the present disclosure.

FIG. 3 shows control variants that can be used according to aspects of the present disclosure. Examples of control variants include 5-channel control, RGBW and RGB modes. Each control variant starts the process shown in FIG. 3 with a different set of channels and ends the process shown in FIG. 3 having been transformed into a control input having RGBW+White CCT channels. The control input having RGBW+White CCT channels coming from the process of FIG. 3 is ready to be processed according to the method shown in FIG. 2.

According to an aspect of the present disclosure a 5-channel control RGBW+White CCT can be used directly to control a lighting fixture, where White CCT corresponds to the CCT of the white channel.

Referring to FIG. 2, processing circuitry receives a RGBW+White CCT command from the user at step 202. Before outputting it on its RGBW channels, the processing unit modifies the channel values to emulate the desired white CCT of the white channel.

At step 204, the processing circuitry uses the White channel level and the desired CCT value to compute RGBW' which represents the RGBW mix to obtain the correct CCT of the white channel at 100%.

At step 206, the processing circuitry scales RGBW' according to the desired level of the emulated white component. For instance, if the initial W component was 50%, then the RGBW' components are scaled at 50% as well.

At step 208, RGBW', which represent the RGBW levels for the emulated white component, are then added by the processing circuitry with the setpoint's R, G, and B values, to add the color components to the mix. This results in unscaled correct relative ratios of RGBW channels with the emulated white component, RGBW".

At step 210, the processing circuitry computes the global intensity of the RGBW mix in the received RGBW+White CCT command.

At step 212, the unscaled correct relative ratios of RGBW channels (RGBW") are then scaled to match the computed global intensity of the RGBW mix in the received RGBW+White CCT command. At step 214, the resulting RGBW''' levels are then applied to the physical LEDs of the lighting fixture to provide a mix of the desired RGB and W light, wherein the W component is corrected with the CCT specified in the configuration of the device.

The disclosed method and apparatus can be used to enable various different types of control using various different sets of channels depending on a desired level of control. FIG. 3 describes three examples of types of control, which can be applied to protocols like DMX. Each of these examples determine how they generate the five channels of control that end up being the input to the method described above with reference to FIG. 2.

In first type of control, at step 302, an RGBW+White CCT setpoint is received from a controller. As described above with respect to FIG. 2, the 5-channel control RGBW+White CCT can be used directly on the fixture, where White CCT corresponds the CCT of the white channel.

In a second type of control, at step 304, an RGBW setpoint is received from a controller. According to an aspect of the present disclosure, the White CCT can be determined from the fixture at step 306, rather than from the controller. For example, the White CCT can be a pre-configured setting, or it can be dynamically computed (i.e. based on time or overall light output intensity). At step 308, the White CCT is combined with the RGBW setpoint to generate a 5 channel control RGBW+White CCT. This second type of control is referred to herein as the RGBW mode.

In a third type of control, at step 310, a RGB setpoint is received from a controller. According to an aspect of the present disclosure, the White CCT can be determined from the fixture at step 312, rather than from the controller. For example, the White CCT can be a pre-configured setting, or it can be dynamically computed (i.e. based on time or overall light output intensity). At step 314, the White CCT is combined with the RGBW setpoint to generate a 5 channel control RGBW+White CCT. This third type of control is referred to herein as RGB mode.

According to an aspect of the present disclosure, the third type of control can optionally be modified to compute an automatic level of white based only on RGB channels at step 313, which enabled 3-channel RGB mode as well.

According to another aspect of the present disclosure (not shown), a 4-channel control option could include RGB channels and a White CCT component. In this embodiment, the value of the white channel can be computed in a manner similar to step 313 in RGB mode, but wherein the White CCT value comes from the controller rather than from the lighting fixture.

Finally, according to another aspect of the present disclosure, RGB channels could also be expressed as Hue, Saturation and Intensity, providing additional control options, using similar mechanics.

In an illustrative embodiment, the present disclosure provides a method of controlling a lighting apparatus. In this embodiment, the method includes computing a first adjusted RGBW signal (emulated white) based on a received RGBW+White CCT setpoint, wherein the first adjusted RGBW signal represents an RGBW mix (RGB ratios) that would obtain a desired White CCT level of a White channel of the RGBW signal at 100% intensity. The method then includes computing a scaled first adjusted RGBW signal at a scale corresponding to the control level of the White channel, and adding the Red, Green and Blue levels of the received RGBW+White setpoint to the scaled first RGBW signal to compute a second adjusted RGBW signal. A global intensity ratio is then computed based on the received RGBW+White CCT setpoint. A scaled second adjusted RGBW signal having an intensity ratio matching the global intensity ratio is then computed and the scaled second adjusted RGBW signal is applied to control the lighting apparatus.

Another illustrative embodiment of the present disclosure provides a lighting apparatus. In this embodiment, the lighting apparatus includes controller circuitry configured to provide lighting control signals on a plurality of channels for controlling Red, Green, Blue, and White levels and a White CCT signal in the lighting apparatus to generate a desired color combination and a desired White CCT level. The lighting apparatus also includes processor circuitry configured compute adjusted the Red, Green, Blue and White levels based on the White CCT signal to provide a desired White CCT level while simultaneously providing the desired Red, Green and Blue levels. In some embodiments, the processor circuitry is configured to scale the adjusted Red, Green, Blue and White levels to match color intensity ratios of the Red, Green Blue and White levels.

Although the present inventive concept is described herein in terms of various aspects and embodiments, it should be understood by those of ordinary skill in the art that various changes in form and detail may be made therein without departing from the scope of the present disclosure as defined by the following claims.

The invention claimed is:

1. A method of controlling a lighting apparatus, the method comprising:
receiving a multi-channel signal for controlling the lighting apparatus, the multi-channel signal includes a RGB setpoint or a RGBW setpoint;
converting the multi-channel signal into an RGBW+ White correlated color control CCT) setpoint, the RGBW+White CCT setpoint including a control level (% intensity) for each of a Red, Green, Blue and White channel and a White CCT level;
providing the control level for each of the Red, Green, Blue, and White Channel and the White CCT level to a plurality of LEDs of the lighting apparatus for illumination; and
causing the plurality of LEDs of the lighting apparatus to illuminate based on the control level for each of the Red, Green, Blue, and White Channel and the White CCT level.

2. The method of claim 1, further comprising:
computing a first adjusted RGBW signal (emulated white) based on the white channel control level and the White CCT level, wherein the first adjusted RGBW signal represents an RGBW mix (RGB ratios) that would obtain the White CCT level of the white channel at 100% intensity;
scaling the first adjusted RGBW signal to compute a scaled first adjusted RGBW signal at a scale corresponding to the White channel control level in the RGBW+White CCT setpoint;
adding the Red, Green and Blue levels of the RGBW+ White setpoint to the scaled first adjusted RGBW signal to compute a second adjusted RGBW signal;
computing a global intensity ratio based on the RGBW setpoint;
scaling the second adjusted RGBW signal to compute a scaled second adjusted RGBW signal based on the global intensity ratio, wherein the intensity ratio of the scaled second adjusted RGBW signal matches the global intensity ratio; and
applying the scaled second adjusted RGBW signal to control the lighting apparatus.

3. The method of claim 1, wherein the multi-channel signal comprises the RGBW setpoint, the method comprising:
receiving the RGBW setpoint from a controller; and
combining the RGBW setpoint with a preconfigured White CCT setpoint to generate the RGBW+White CCT setpoint.

4. The method of claim 1, wherein the multi-channel signal comprises the RGBW setpoint, the method comprising:
receiving the RGBW setpoint from a controller;
dynamically computing a White CCT setpoint based on the RGBW setpoint; and
combining the RGBW setpoint with a dynamically computed White CCT setpoint to generate the RGBW+ White CCT setpoint.

5. The method of claim 1, wherein the multi-channel signal comprises the RGB setpoint, the method comprising:
receiving the RGB setpoint from a controller;
computing a White component based on RGB values of the RGB setpoint; and
combining the RGB setpoint and the White component with a preconfigured White CCT setpoint to generate the RGBW+White CCT setpoint.

6. The method of claim 1, wherein the multi-channel signal comprises the RGB setpoint, the method comprising:
receiving the RGB setpoint from a controller;
computing a White component based on RGB values of the RGB setpoint;
dynamically computing a White CCT setpoint based on the RGB setpoint and the White component; and
combining the RGB setpoint and the White component with the dynamically computed White CCT setpoint to generate the RGBW+White CCT setpoint.

7. A method of controlling a lighting apparatus, the method comprising:
receiving an RGBW+White CCT setpoint, the RGBW+ White CCT setpoint including a control level (% intensity) for each of a Red, Green, Blue and White channel and a desired White CCT level;
computing a first adjusted RGBW signal based on the white channel control level and the desired White CCT level, wherein the first adjusted RGBW signal represents an RGBW mix that would obtain the desired White CCT level of the white channel at 100% intensity;
scaling the first adjusted RGBW signal to compute a scaled first adjusted RGBW signal at a scale corresponding to the White channel control level in the received RGBW+White CCT setpoint;
adding the Red, Green and Blue levels of the received RGBW+White setpoint to the scaled first adjusted RGBW signal to compute a second adjusted RGBW signal;
computing a global intensity ratio based on the received RGBW command;
scaling the second adjusted RGBW signal to compute a scaled second adjusted RGBW signal based on the global intensity ratio, wherein the intensity ratio of the scaled second adjusted RGBW signal matches the global intensity ratio; and
applying the scaled second adjusted RGBW signal to control the lighting apparatus.

8. An apparatus for controlling a lighting device, the apparatus comprising:

processing circuitry interposed between controller circuitry and the lighting device, wherein the processing circuitry is configured to:
  receive a multi-channel signal for controlling the lighting apparatus, the multi-channel signal includes a RGB setpoint or a RGBW setpoint; and
  convert the multi-channel signal into an RGBW+White CCT setpoint, the RGBW+White CCT setpoint including a control level (% intensity) for each of a Red, Green, Blue and White channel and a desired White CCT level; and
  provide the control level for each of the Red, Green, Blue, and White Channel and the White CCT level to a plurality of LEDs of the lighting apparatus for illumination.

9. The apparatus of claim 8, wherein the processing circuitry is further configured to:
  compute a first adjusted RGBW signal based on the white channel control level and the desired CCT level, wherein the first adjusted RGBW signal represents an RGBW mix (RGB ratios) that would obtain the desired CCT level of the white channel at 100% intensity;
  scale the first adjusted RGBW signal to compute a scaled first adjusted RGBW signal at a scale corresponding to the control level of the White channel in the received RGBW+White CCT setpoint;
  add the Red, Green and Blue levels of the received RGBW+White CCT setpoint to the scaled first adjusted RGBW signal to compute a second adjusted RGBW signal (D);
  compute a global intensity ratio based on the received RGBW+White CCT setpoint;
  scale the second adjusted RGBW signal to compute a scaled second adjusted RGBW signal based on the global intensity ratio, wherein the intensity ratio of the scaled second adjusted RGBW signal matches the global intensity ratio; and
  apply the scaled second adjusted RGBW signal to control the lighting device.

10. The apparatus of claim 8, wherein the multi-channel signal comprises the RGBW setpoint, and wherein the processing circuitry is further configured to:
  receive the RGBW setpoint from the controller; and
  combine the RGBW setpoint with a preconfigured White CCT setpoint to generate the RGBW+White CCT setpoint.

11. The apparatus of claim 8, wherein the multi-channel signal comprises the RGBW setpoint, and wherein the processing circuitry is further configured to:
  receive the RGBW setpoint from the controller;
  dynamically compute a White CCT setpoint based on the RGBW setpoint; and
  combine the RGBW setpoint with a dynamically computed White CCT setpoint to generate the RGBW+White CCT setpoint.

12. The apparatus of claim 8, wherein the multi-channel signal comprises the RGB setpoint, and wherein the processing circuitry is further configured to:
  receive the RGB setpoint from the controller;
  compute a White component based on RGB values of the RGB setpoint; and
  combine the RGB setpoint and the White component with a preconfigured White CCT setpoint to generate the RGBW+White CCT setpoint.

13. The apparatus of claim 8, wherein the multi-channel signal comprises the RGB setpoint, and wherein the processing circuitry is further configured to:
  receive the RGB setpoint from a controller;
  compute a White component based on RGB values of the RGB setpoint;
  dynamically compute a White CCT setpoint based on the RGB setpoint and the White component; and
  combine the RGB setpoint and the White component with the dynamically computed White CCT setpoint to generate the RGBW+White CCT setpoint.

14. An apparatus for controlling a lighting device, the apparatus comprising:
  processing circuitry interposed between controller circuitry and the lighting device, wherein the processing circuitry is configured to:
  receive an RGBW+White CCT setpoint, the RGBW+White CCT setpoint including a control level (% intensity) for each of a Red, Green, Blue and White channel and a desired White CCT level;
  compute a first adjusted RGBW signal based on the white channel control level and the desired CCT level, wherein the first adjusted RGBW signal represents an RGBW mix (RGB ratios) that would obtain the desired CCT level of the white channel at 100% intensity;
  scale the first adjusted RGBW signal to compute a scaled first adjusted RGBW signal at a scale corresponding to the control level of the White channel in the received RGBW+White CCT setpoint;
  add the Red, Green and Blue levels of the received RGBW+White CCT setpoint to the scaled first adjusted RGBW signal to compute a second adjusted RGBW signal (D);
  compute a global intensity ratio based on the received RGBW+White CCT setpoint;
  scale the second adjusted RGBW signal to compute a scaled second adjusted RGBW signal based on the global intensity ratio, wherein the intensity ratio of the scaled second adjusted RGBW signal matches the global intensity ratio; and
  apply the scaled second adjusted RGBW signal to control the lighting device.

* * * * *